UNITED STATES PATENT OFFICE.

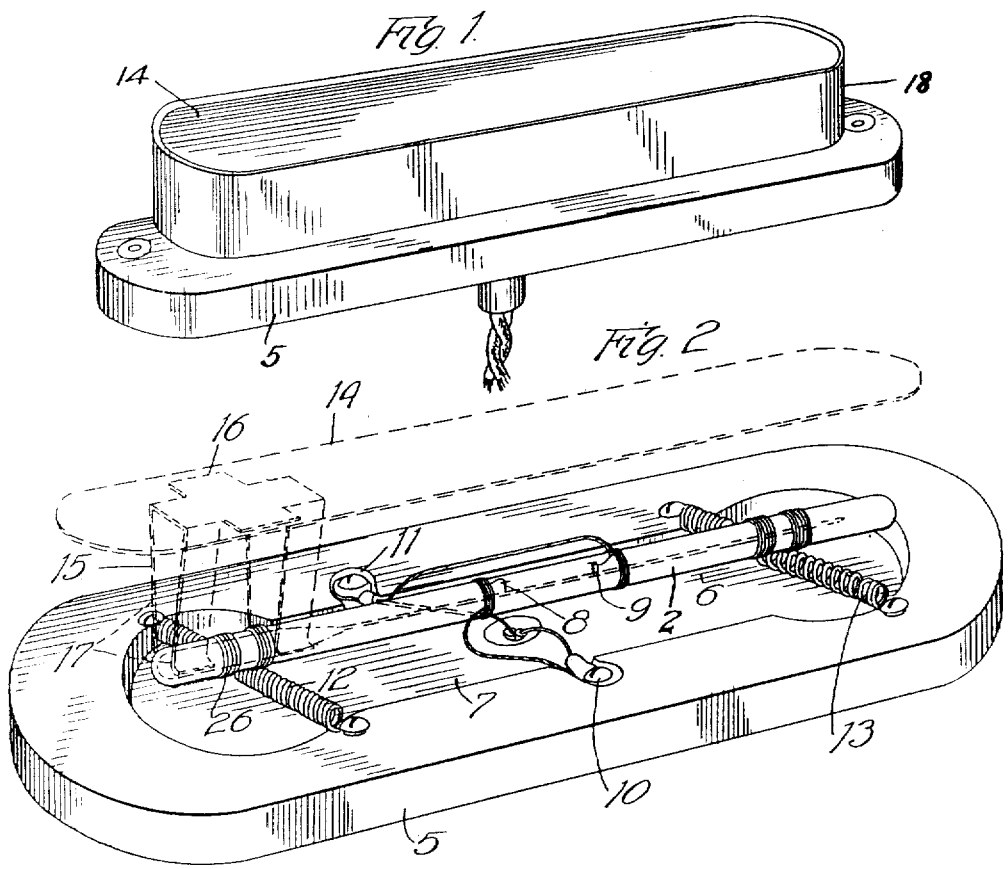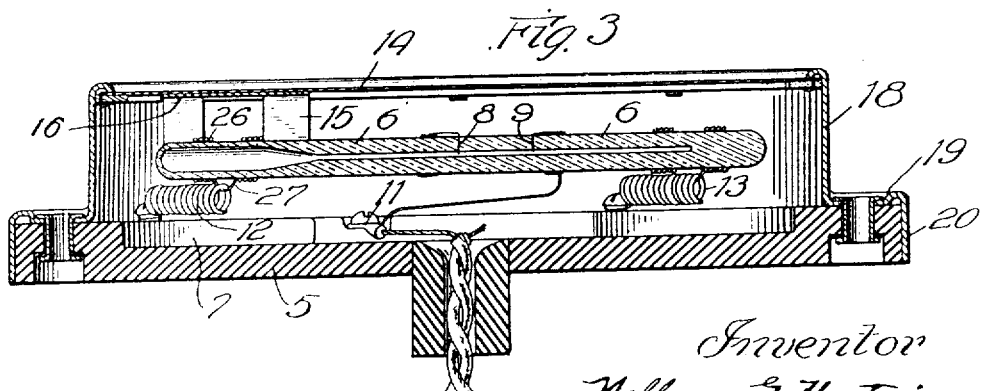

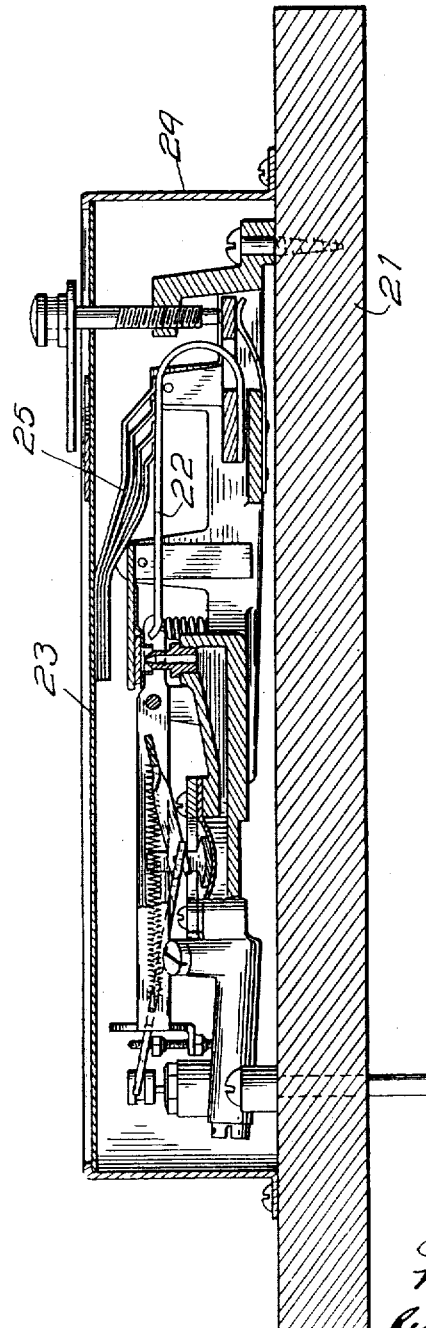

WILLIAM G. HARTWIG, OF CHICAGO, ILLINOIS, ASSIGNOR TO RAILWAY UTILITY COMPANY, OF CHICAGO, ILLINOIS, A CORPORATION OF ILLINOIS.

THERMOSTAT.

1,386,618.  Specification of Letters Patent.  Patented Aug. 9, 1921.

Application filed July 11, 1918. Serial No. 244,495.

*To all whom it may concern:*

Be it known that I, WILLIAM G. HARTWIG, a citizen of the United States, residing at Chicago, in the county of Cook and State of Illinois, have invented certain new and useful Improvements in Thermostats, of which the following is a specification.

My invention relates more particularly to thermostats for controlling the temperature in the rooms of buildings, street and other railway conveyances, and in general in apartments where it is desired to maintain a fairly uniform temperature. There are two forms of thermostats in common use, one of which depends on the difference in expansion under similar changes of temperature of two metals, the mechanism employed commonly involving a strip or bar composed of two longitudinal strips of the respective metals, which bar because of its composition bends under change of temperature, the movement of the bar being used to control some form of heat supplying device. The other common form of thermostat referred to above comprises a mercury column, similar to a thermometer, which rises and falls with changes in temperature to close and open an electric circuit controlling some form of heating apparatus. My invention is applicable to either of these two forms of thermostat and has for its object to increase the delicacy and accuracy thereof and also to render the instrument less liable to damage and to being tampered with, and to make it less obtrusive and more adaptable to different locations. In the thermostats of the prior art, whether of the one type or the other, it has been considered and was in fact necessary that free access of the surrounding atmosphere to the sensitive member of the thermostat be provided for in order that the instrument should respond promptly to sufficiently small variations in temperature.

Therefore it was necessary to mount the instrument in an open case which not only permitted access of dirt, dust and moisture to affect the parts and their mechanical working, but permitted easy access to any one desiring to tamper with the instrument. This latter characteristic was particularly unfortunate because those unfamiliar with the construction and operation would frequently in their endeavors to regulate the instrument, apply tools thereto in such a way as to break or otherwise injure the apparatus. According to my invention the thermostat is completely inclosed and in fact may be hermetically sealed within the case excluding dirt and moisture and preventing tampering with the device. At the same time the instrument is rendered much more sensitive than former devices of the same kind. In its broader aspect the invention consists in furnishing the instrument with a heat interchanging element of extended surface for contact with the atmosphere of the apartment, the temperature of which is to be regulated, and which is adapted to communicate heat from the atmosphere to the sensitive element of the thermostat or vice versa so that the latter more readily responds to changes in atmospheric temperature. Preferably, the heat interchanging element forms a part of the inclosing case for the thermostat and in case great accuracy is desired it may be heat insulated from the support so as to exchange heat only with the atmosphere. Other features of the invention will be understood from the following specification in which I have described in detail two preferred forms of the invention. It is to be understood however, that the specific disclosure is for the purpose of exemplification only and that the scope of the invention is defined in the following claims in which I have endeavored to distinguish it from the prior art so far as known to me without, however, relinquishing or abandoning any portion or feature thereof.

Referring to the drawings, Figures 1, 2 and 3 illustrate respectively a perspective view of the entire instrument, a similar view on a larger scale of an instrument with a portion thereof removed, parts being shown in dotted line, and a longitudinal section of my invention as applied to a thermostat of the thermometer or mercury type; and Fig. 4 is a longitudinal section on an enlarged scale of my invention as applied to a thermostat of the mechanical class. Referring first to Figs. 1, 2 and 3 a base is shown at 5 upon which a thermometer thermostat 6 is supported. The base may be of any suitable material but preferably of a material of low heat conductivity and is hollowed or recessed at 7 for a purpose which will appear. The sensitive element 6 is in the form of a thermometer 2 having wires 8, 9 penetrating the glass tube thereof and in contact with the mercury column within. The purpose of these wires is to close an electric controlling circuit when the thermometer mounts sufficiently high in the tube. The terminals for wires 8 and 9 are shown at 10, 11 respectively. One of the objections which is most frequently urged against the mercury thermostat is the delicacy of the glass tube thereof which is quite liable to breakage by rough handling and shock, much of the trouble arising from the fact that the heavy mass of mercury causes a hammer on the tube whenever the latter is jarred. In order to obviate or minimize trouble from this source the sensitive element is mounted upon springs 12, 13, which as shown span the hollow 7 of the base and support the tube out of contact with the latter. Preferably the springs are arranged at an incline to the axis of the base to cushion the latter from shock either transversely or longitudinally of the base.

As shown more particularly in Figs. 2 and 3 the thermometer thermostat is attached to the respective springs by means of double clamping coils 26, the coils of which are connected by an intermediate loop 27 which engages the spring to which it is connected as shown in Fig. 3.

Even when completely exposed to the atmosphere the sensitive element or thermometer tube 6 presents a very limited polished surface of contact and therefore responds but slowly to changes in atmosphere temperature.

In order to provide for the more rapid interchange of heat between the sensitive element and the atmosphere I provide a heat interchange element 14 which in the present instance takes the form of a thin flat plate of heat conductive material, preferably metal. For this purpose the more conductive metals are preferably employed and I find copper, silver and aluminum especially adapted to produce the desired result. Preferably the element is in the form of a thin sheet of metal and is in heat conductive relation with the sensitive element of the thermostat. In the particular form shown this relation is maintained by a clip or clamp 15 which is struck up from a thin metal plate, the base 16 of which is soldered, or otherwise secured to the heat interchange plate and the gripping members 17 of which are bent to bear upon the tube of the thermometer, on opposite sides of the bulb containing the bulk of the mercury therein. The heat interchange element 14 has a much more extended surface than the tube 6 and is also by reason of its material much better adapted to exchange heat with the atmosphere, and therefore it assists very largely in speedily reducing differences of temperature between the sensitive element and the atmosphere.

If desired the instrument may be used without an inclosure. But for most purposes, as for example in connection with the heating system of cars or rooms, it is desirable to inclose the sensitive element to protect it from dirt and moisture and injury from improper handling. Therefore an inclosure or container for the instrument may be completed by adding a surrounding wall 18 beween the heat interchange plate and the base. Preferably wall 18 is formed of a material of much lower heat conductive capacity than the interchange plate and I have found that for most purposes if copper or other highly conductive metal be used for the heat interchange element iron may be used for the wall 18, its heat conductive capacity being very much less than that of copper. Other materials than metal may be used for this purpose, however, if desired. The wall 5 might be made of the same material as the plate 14, but in this case the instrument would not be quite so accurate because of the interchange of heat with the support. If a less conductive metal than copper be employed for the heat interchange plate it becomes for obvious reasons desirable to employ a less heat conductive material than iron for the wall 18, and preferably some non-metal is substituted. I have shown the wall 18 as provided with a flat flange 19 and depending skirt 20 for fitting around the edge of the base 5, but obviously this is a non-essential.

In Fig. 4 as above stated, I have shown my invention as applied to a mechanical thermostat. That illustrated is of a type so well known that it is unnecessary to describe the same in detail. It is sufficient to observe that the base of the instrument is shown at 21 and the sensitive element at 22, this element being composed of superimposed strips of two metals of widely different coefficients of expansion. The heat interchange plate 23 and wall 24 may be substantially the same as those described in connection with the other modification of the invention and act in the same manner. In order to effect the conduct of heat between the sensitive element 22 and the heat interchange plate 23 I provide the latter with a series of thin springs 25 of heat conductive material which springs, however, are so light that they do not materially affect the movement of the bar or heat sensitive element 22 under changes of temperature.

As above stated the casing may be hermetically sealed if desired and in any event is ordinarily closed against dust and tampering by an unauthorized person. Obviously the form of the casing may be any desired, and if preferred the instrument may be let into a recess formed in the wall of the compartment to conceal the same, the sensitive plate being in the plane of the surface of the wall and if desired colored to correspond thereto.

I claim:

1. A thermostat comprising a base, a metal cover, secured to the base and forming a substantially closed chamber therewith, a thermostatic element mounted in said chamber and a heat conducting element in contact with the cover and with the thermostat element.

2. In a device of the class described, a base, a hollow cover mounted on the base secured thereto and forming with said base a substantially closed chamber, a thermostatic element mounted in said chamber, a heat conducting element in conductive relation to the hollow cover and to the thermostatic element, and electrical connections extending through the base and connected to said thermostatic element.

3. In a device of the class described, a base, a metallic cover supported on the base and forming therewith a closed chamber, a thermometer-thermostat supported in said closed chamber and protected thereby from tampering and a heat conducting element in heat conductive relation to said cover and thermometer-thermostat.

WILLIAM G. HARTWIG.